(12) United States Patent
Konga

(10) Patent No.: US 12,285,977 B1
(45) Date of Patent: Apr. 29, 2025

(54) WHEEL PARTITION ASSEMBLY CONFIGURED TO MODIFY TIRE CAVITY RESONANCE

(71) Applicant: GM GLOBAL TECHNOLOGY OPERATIONS LLC, Detroit, MI (US)

(72) Inventor: Murali K. Konga, Karnataka (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/377,554

(22) Filed: Oct. 6, 2023

(51) Int. Cl.
*B60C 19/00* (2006.01)
*B60B 21/12* (2006.01)

(52) U.S. Cl.
CPC ............ *B60C 19/002* (2013.01); *B60B 21/12* (2013.01); *B60B 2900/133* (2013.01)

(58) Field of Classification Search
CPC B60C 19/002; B60C 5/02; B60C 5/04; B60C 5/08; B60C 5/20; B60C 5/24; B60B 21/12
See application file for complete search history.

(56) References Cited

U.S. PATENT DOCUMENTS

| | | | | |
|---|---|---|---|---|
| 3,608,603 A | * | 9/1971 | Pfeiffer | ..................... B60C 5/04 152/511 |
| 4,054,169 A | * | 10/1977 | Devienne | .................. B60C 5/24 152/337.1 |
| 4,909,295 A | * | 3/1990 | Nirei | ....................... B60C 19/00 152/340.1 |
| 5,479,974 A | * | 1/1996 | Noggle | ................... B60C 19/00 152/450 |
| 2023/0358328 A1 | * | 11/2023 | Quintana | .............. F16K 15/066 |

FOREIGN PATENT DOCUMENTS

| CN | 2547538 Y | 4/2003 |
|---|---|---|
| CN | 105856984 A | 8/2016 |

OTHER PUBLICATIONS

Office Action dated Jul. 2, 2024 from German Patent Office for German Patent No. 10 2023 133 749.1; 4pgs.

\* cited by examiner

*Primary Examiner* — Robert C Dye

(57) ABSTRACT

A partition assembly configured to be mounted in a tire cavity defined between a wheel and a tire to divide the tire cavity into a plurality of segments, the partition assembly including at least one air line and a plurality of baffles. Each one of the plurality of baffles including: a base configured to be mounted to the wheel, the base defining an air passageway in fluid communication with the at least one air line; and an expandable body connected to the base and in fluid communication with the air passageway of the base, the expandable body configured to be filled with air from the at least one air line. Each one of the plurality of baffles is configured to receive air from the at least one air line to expand the plurality of baffles from a deflated configuration to an inflated configuration in which the plurality of baffles are configured to contact an inner wall of the tire coupled to the wheel to divide the tire cavity into the plurality of segments.

16 Claims, 4 Drawing Sheets

WHEEL PARTITION ASSEMBLY CONFIGURED TO MODIFY TIRE CAVITY RESONANCE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a wheel partition assembly configured to modify tire cavity resonance.

Noise generated by an internal combustion engine (ICE) often drowns out other vehicle noises, such as tire cavity noise. Tire cavity noise is generated when tire vibrations cause air inside the tire cavity to vibrate and resonate throughout the tire cavity. Hybrid vehicles generate less engine noise than ICE vehicles, and fully electric vehicles generate no engine noise. As a result, tire noise may become more noticeable to occupants of hybrid vehicles and fully electric vehicles.

SUMMARY

The present disclosure includes, in various features, a partition assembly configured to be mounted in a tire cavity defined between a wheel and a tire to divide the tire cavity into a plurality of segments, the partition assembly including at least one air line and a plurality of baffles. Each one of the plurality of baffles including: a base configured to be mounted to the wheel, the base defining an air passageway in fluid communication with the at least one air line; and an expandable body connected to the base and in fluid communication with the air passageway of the base, the expandable body configured to be filled with air from the at least one air line. Each one of the plurality of baffles is configured to receive air from the at least one air line to expand the plurality of baffles from a deflated configuration to an inflated configuration in which the plurality of baffles are configured to contact an inner wall of the tire coupled to the wheel to divide the tire cavity into the plurality of segments.

In further features, the at least one air line is circular and is in cooperation with each one of the plurality of baffles to deliver air to each one of the plurality of baffles.

In further features, the plurality of baffles are evenly spaced apart about the at least one air line.

In further features, the at least one air line includes at least one air valve.

In further features, the base of each one of the plurality of baffles includes a pressure relief valve configured to allow air to flow therethrough to establish a uniform pressure across the plurality of segments of the tire cavity.

In further features, the base of each one of the plurality of baffles defines an aperture in fluid communication with the at least one air line and in fluid communication with the air passageway of the base.

In further features, the base includes acrylonitrile butadiene styrene (ABS) plastic and the expandable body includes butyl rubber.

In further features, each one of the plurality of baffles further includes a seal extending about an outer perimeter of the expandable body.

In further features, the seal is inflatable and is in fluid communication with the at least one air line by way of the base to receive air from the at least one air line; and the seal is configured to contact the inner wall of the tire mounted to the wheel to form an air-tight seal with the tire and define the plurality of segments when the seal is inflated with air from the at least one air line.

In further features, the seal is a nylon fabric reinforced polyurethane expandable seal.

In further features, the expandable body defines a slot, and the seal is seated within the slot.

The present disclosure further includes, in various features, a partition assembly configured to be mounted in a tire cavity defined between a wheel and a tire to divide the tire cavity into a plurality of segments. The partition assembly includes at least one air line and a plurality of baffles. Each one of the plurality of baffles includes: a base configured to be mounted to the wheel, the base defining an air passageway in fluid communication with the at least one air line; a body connected to the base; and a seal extending about an outer perimeter of the body and in fluid communication with the air passageway of the base. The seal is expandable and configured to be filled with air from the at least one air line to expand the seal from a deflated configuration to an inflated configuration in which the seal is configured to contact an inner wall of the tire coupled to the wheel to divide the tire cavity into the plurality of segments.

In further features, the body is an expandable body in fluid communication with the at least one air line by way of the base.

In further features, the at least one air line is a single air line extending around the wheel and is in fluid communication with each one of the plurality of baffles.

In further features, the plurality of baffles are evenly spaced apart about the at least one air line, and the plurality of segments of the tire cavity are air-tight segments when the seal is in contact with the inner wall of the tire.

In further features, the partition assembly divides the tire cavity into at least four of the plurality of segments.

In further features, the seal includes a pair of inflatable lips secured to the outer perimeter of the body with a mechanical interlock.

The present disclosure further includes, in various features, a wheel assembly including: a wheel including a rim; a tire mounted to the wheel to define a tire cavity between the wheel and the tire: a partition assembly mounted to the wheel in the tire cavity. The partition assembly includes: an air line extending around the wheel, the air line in cooperation with a valve configured to couple with an air source for introducing air from the air source into the air line; and a plurality of baffles mounted to the wheel and connected to the air line to receive air from the air line, each one of the plurality of baffles is expandable from a deflated configuration to an inflated configuration in response to air from the air line flowing into the plurality of baffles, in the inflated configuration the plurality of baffles contact an inner wall of the tire to divide the tire cavity into a plurality of air-tight segments.

In further features, each one of the plurality of baffles includes an expandable body in fluid communication with the air line to receive air from the air line for inflating the expandable body.

In further features, each one of the plurality of baffles includes a seal extending about an outer perimeter of the expandable body, the seal is in fluid communication with the air line to receive air from the air line for inflating the seal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
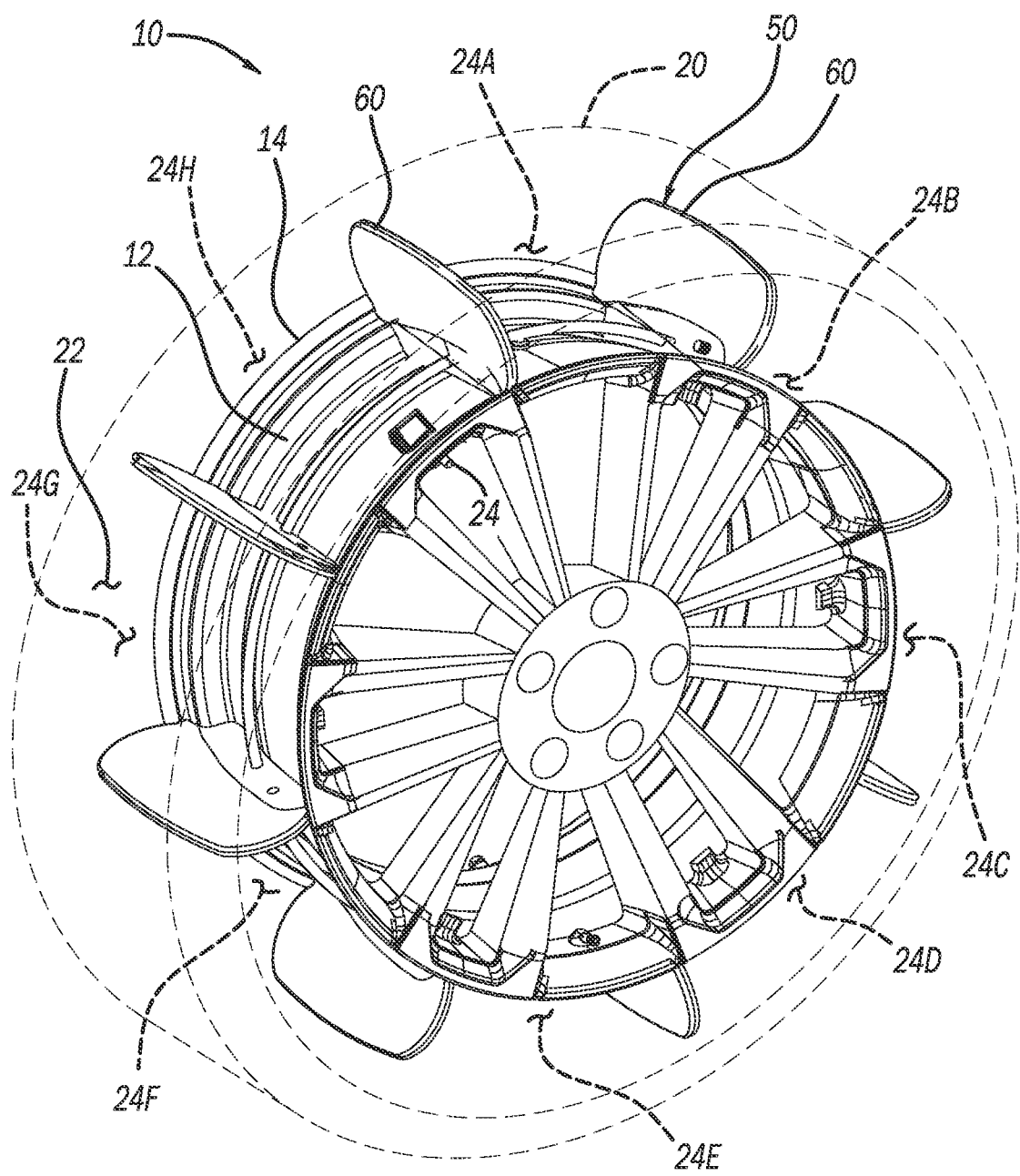
FIG. 1 is a perspective view of a wheel assembly including a partition assembly in accordance with the present disclosure.

FIG. 1 illustrates a wheel assembly 10 in accordance with the present disclosure. The wheel assembly 10 generally includes a wheel 12 having a rim 14. Mounted to the wheel 12 is a tire 20. A tire cavity 22 is defined between the wheel 12 and the tire 20. A wheel valve 24 is in fluid configuration with the tire cavity 22. The wheel valve 24 is configured to cooperate with any suitable air source in order to fill the tire cavity 22 with air from the air source.

The wheel assembly 10 is configured to be mounted to any suitable vehicle, such as any suitable passenger vehicle, utility vehicle, recreational vehicle, mass transit vehicle, military vehicle, construction vehicle, trailer, aircraft, etc. The wheel assembly 10 may also be configured for use in any suitable nonvehicular application. Exemplary nonvehicular applications include, but are not limited to, manufacturing equipment, military equipment, construction equipment, etc.

Figure 2:
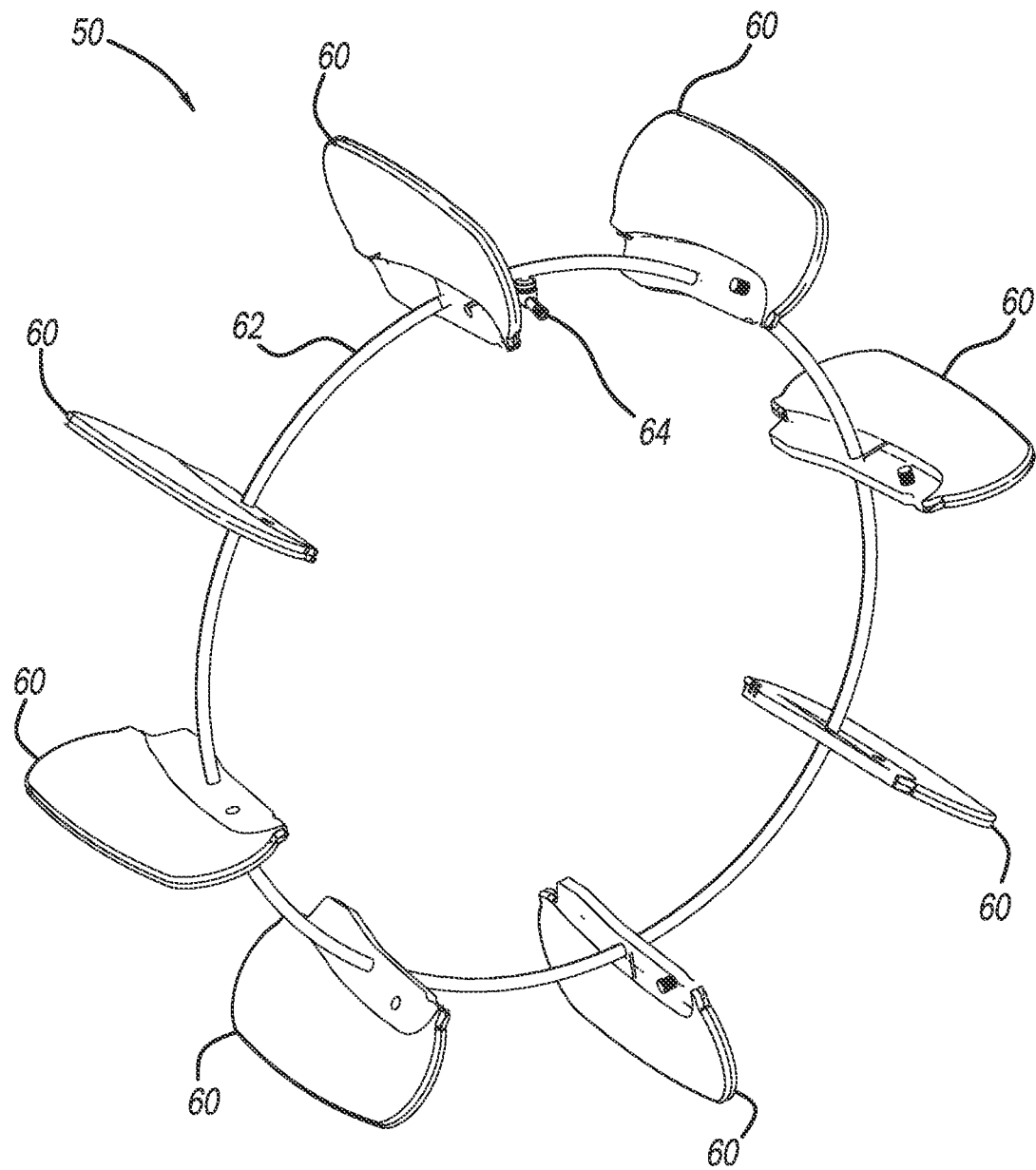
FIG. 2 is a perspective view of the partition assembly of FIG. 1 separated from a wheel and a tire of the wheel assembly.

The wheel assembly 10 further includes a partition assembly 50 (see FIGS. 1 and 2). The partition assembly 50 is between the wheel 12 and an inner wall 26 (see FIGS. 5A and 5B) of the tire 20. The partition assembly 50 is mounted to the wheel 12 as described herein.

The partition assembly 50 generally includes a plurality of baffles 60 and an air line 62. The air line 62 includes an air valve 64, which is configured to cooperate with any suitable air source for supplying air into the air line 62. Each one of the baffles 60 is in fluid communication with the air line 62 to receive air from the air line 62. The air line 62 may be circular as illustrated, so as to extend around the wheel 12. The air line 62 may be a continuous air line extending entirely around the wheel 12 and be in fluid communication with each one of the baffles 60. Alternatively, the air line 62 may include a plurality of air lines connecting neighboring ones of the baffles 60 together.

Any suitable number of baffles 60 may be included. In the example of FIGS. 1 and 2, the partition assembly 50 includes eight baffles 60, which are evenly spaced apart around the partition assembly 50. Any other suitable number of baffles 60 may be included. The baffles 60 define the tire cavity 22 into a plurality of segments. The number of segments defined depends on the number of baffles 60 included. In the example of FIG. 1, the eight baffles 60 divide the tire cavity 22 into eight segments 24A, 248, 24C, 24D, 24E, 24F, 24G, 24H, which are air-tight when the baffles 60 are inflated as described herein. Any other suitable number of baffles 60 may be included to divide the tire cavity 22 into any other suitable number of segments. For example, four baffles 60 may be included to divide the tire cavity 22 into four segments.

Figure 3:
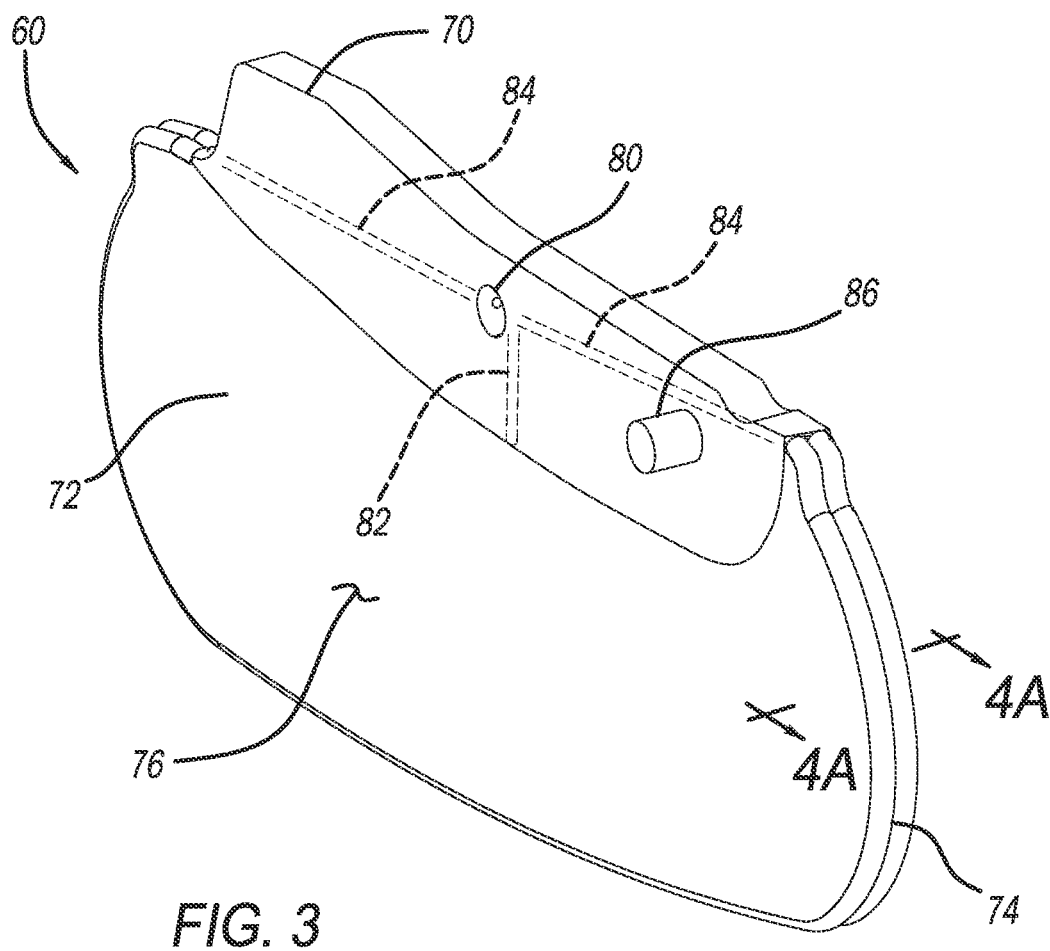
FIG. 3 is a perspective view of one of a plurality of baffles of the partition assembly of FIG. 2.

With particular reference to FIG. 3, each one of the plurality of baffles 60 includes a base 70 and an expandable body 72. At an outer perimeter of the expandable body 72 is a seal 74. The base 70 may be made of any suitable material, such as, but not limited to, acrylonitrile butadiene styrene (ABS) plastic. The expandable body 72 may be made of any suitable expandable material, such as butyl rubber. The seal 74 may be made of any suitable material, such as a nylon fabric reinforced polyurethane expandable seal.

The base 70 of each one of the plurality of baffles 60 is mounted to the wheel 12 in any suitable manner. For example, the base 70 may be secured to the wheel 12 with a suitable adhesive. The base 70 defines an aperture 80, which is connected to the air line 62 and in fluid communication with the air line 62.

The base 70 defines one or more passageways in fluid communication with the aperture 80 to receive airflow from the air line 62. In the example illustrated, the base 70 defines a first air passageway 82, which extends from the aperture 80 to the expandable body 72. The base 70 further defines second air passageways 84, which extend from the aperture 80 to the seal 74.

The baffle 60 is configured such that air from the air line 62 flows into the baffle 60 through the aperture 80. From the aperture 80, air flows through the first air passageway 82 into an air chamber 76 defined by the expandable body 72. Air flow into the air chamber 76 expands the expandable body 72 from a deflated configuration to an inflated configuration. Air also flows from the aperture 80 through the second air passageways 84 into the seal 74. Air flow into the seal 74 expands the seal from a deflated configuration to an inflated configuration, as explained herein. Although the baffle 60 is illustrated as including both the first air passageway 82 and the second air passageways 84, in some applications the baffle 60 may include only the first air passageway 82 to only inflate the air chamber 76 and not include the second air passageways 84. In other applications, the baffle 60 may only include the second air passageways 84 to only inflate the seal 74 and not include the first air passageway 82.

The base 70 of each one of the baffles 60 may further include a pressure relief valve 86. The pressure relief valve 86 ensures that air pressure is uniform across all of the segments 24A-24H of the tire cavity 22. For example, in the event of a tire puncture, the pressure relief valves 86 allow air to flow between the segments 24A-24H to maintain uniformity of the tire pressure across all segments.

Figure 4A:
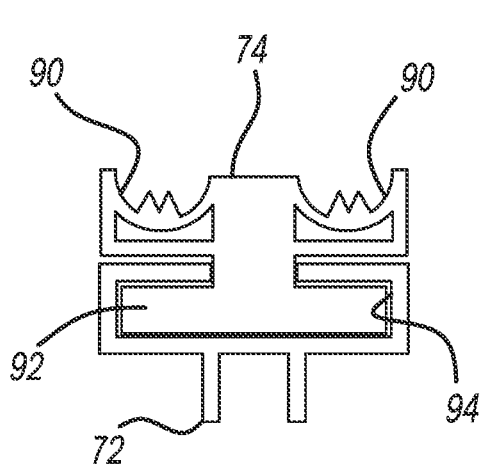
FIG. 4A is a cross-sectional view taken along line 4A-4A of FIG. 3 including a seal of the baffle a deflated configuration.
Figure 4B:
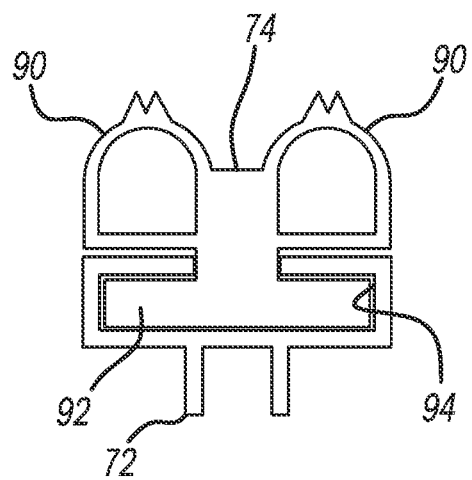
FIG. 4B is a cross-sectional view of the seal of FIG. 4A in an inflated configuration.

With reference to FIGS. 4A and 4B, the seal 74 will now be described in additional detail. The seal 74 of each one of the baffles 60 includes a pair of lips 90, which are configured to be filled with air. FIG. 4A illustrates the pair of lips 90 in a deflated configuration. FIG. 4B illustrates the pair of lips 90 in an inflated configuration resulting from air from the air line 62 having been introduced into the pair of lips 90. The lips 90 are mounted to the expandable body 72 in any suitable manner, such as with any suitable mechanical interlock. In the example of FIGS. 4A and 4B, the lips 90 are connected to a tab 92, which may be generally T-shaped as illustrated. The tab 92 is seated in a slot 94 defined at an outer perimeter of the expandable body 72. The slot 94 is configured to not expand, so as to retain the interlock between the pair of lips 90 and the slot 94.

Figure 5A:
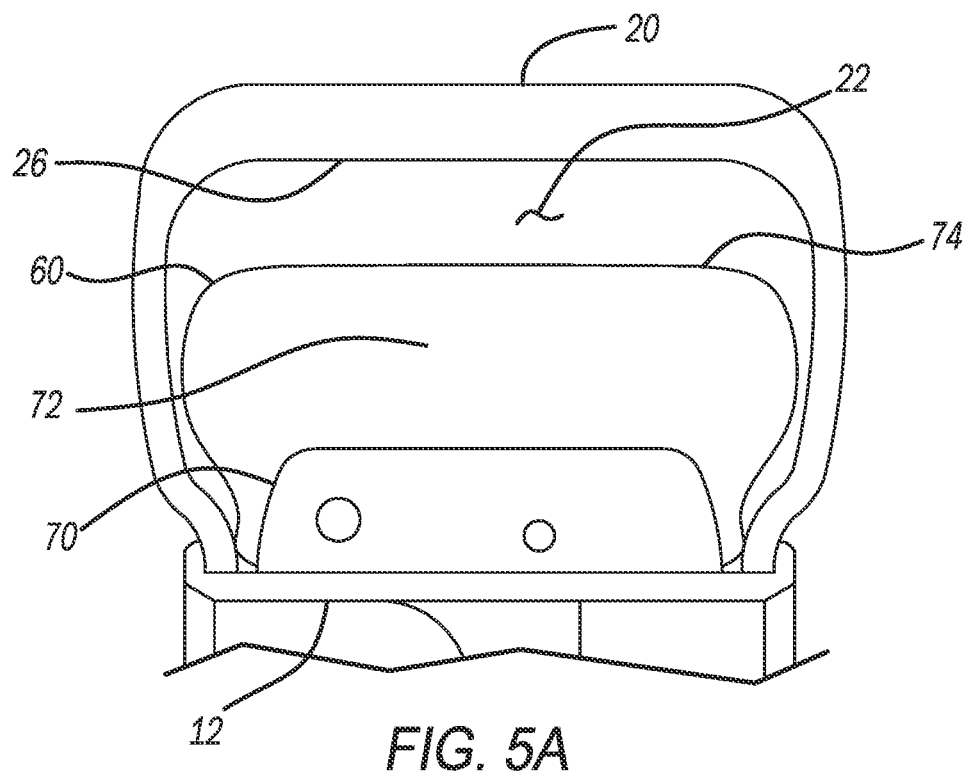
FIG. 5A illustrates one of the plurality of baffles in a deflated configuration.
Figure 5B:
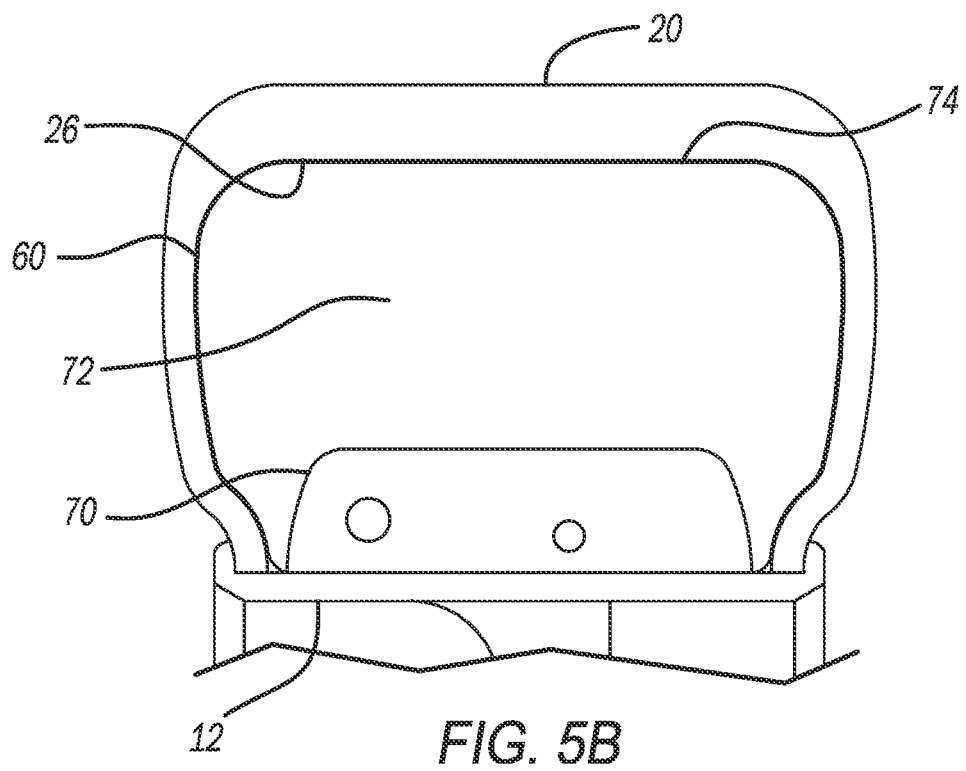
FIG. 5B illustrates one of the plurality of baffles in an inflated configuration.

FIGS. 5A and 5B are cross-sectional views of the wheel assembly 10 illustrating one of the plurality of baffles 60 in the tire cavity 22. FIG. 5A illustrates the baffle 60 in a deflated configuration in which the expandable body 72 and the seal 74 are deflated. The plurality of baffles 60 are typically in the deflated configuration of FIG. 5A prior to the tire 20 being attached to the wheel 12, and prior to inflation of the tire 20. The tire 20 is inflated by pumping air into the tire cavity 22 through the wheel valve 24. After the tire 20 is inflated, the plurality of baffles 60 are inflated.

The plurality of baffles 60 are inflated by pumping air into the air line 62 by way of the air valve 64. From the air valve 64, air flows into the base 70 of each one of the baffles 60. At each one of the bases 70, air flows from the aperture 80 through the first air passageway 82 into the air chamber 76 of the expandable body 72 to inflate the expandable body 72. Air also flows through the second air passageways 84 into the pair of lips 90 of the seal 74 to expand the pair of lips 90 to the inflated position of FIG. 4B. Adding air into the air chamber 76 of the expandable body 72, and adding air into pair of lips 90 of the seal 74, expands the plurality of baffles 60 from the deflated configuration of FIG. 5A to an inflated configuration of FIG. 5B. In the inflated configuration of FIG. 5B, the plurality of baffles 60 abut the inner wall 26 of the tire 20 to provide an airtight seal between each one of the plurality of baffles 60 (particularly the inflated seals 74 thereof) and the inner wall 26 of the tire 20, thereby defining the segments 24A-24H of the tire cavity 22.

Noise may be generated in the tire cavity 22 by air inside the tire cavity 22 that has been excited by interaction between the tire 20 and the road surface as the wheel assembly 10 is traveling along a road surface. Tire cavity resonances, such as between 150 Hz to 400 Hz may play a role in reducing/amplifying noise experienced by occupants. The partition assembly 50 of the present disclosure is configured to raise resonant frequencies of the tire cavity 22 to a higher range, which avoids amplification of noise caused by interaction between the tire and the road. More specifically, the baffles 60 divide the tire cavity 22 into smaller segments 24A-24H, which shifts the natural frequencies of the tire cavity 22 to a higher range to avoid resonance with tire vibrations caused by tire interaction with the road. The segments 24A-24H are defined by the baffles 60 when the baffles 60 are inflated with air from the air line 62, which inflates the air chamber 76 and the seal 74. Once inflated, the baffles 60 expand into contact with, and form an airtight seal with, the inner wall 26 of the tire 20 to form the segments 24A-24H, which increase the overall resonant frequency of the tire cavity 22 to a level at which any sound generated due to interaction between the wheel assembly 10 and a road surface is not amplified. As a result, occupants of a vehicle including the wheel assembly 10 will typically experience a quieter passenger cabin.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to" "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A partition assembly configured to be mounted in a tire cavity defined between a wheel and a tire to divide the tire cavity into a plurality of segments, the partition assembly comprising:
   at least one air line; and
   a plurality of baffles, each one of the plurality of baffles including:
      a base configured to be mounted to the wheel, the base defining an air passageway in fluid communication with the at least one air line;
      an expandable body connected to the base and in fluid communication with the air passageway of the base, the expandable body configured to be filled with air from the at least one air line; and
      a seal extending about an outer perimeter of the expandable body,
   wherein each one of the plurality of baffles is configured to receive air from the at least one air line to expand the plurality of baffles from a deflated configuration to an inflated configuration in which the plurality of baffles are configured to contact an inner wall of the tire coupled to the wheel to divide the tire cavity into the plurality of segments.

2. The partition assembly of claim 1, wherein the at least one air line is circular and is in cooperation with each one of the plurality of baffles to deliver air to each one of the plurality of baffles.

3. The partition assembly of claim 2, wherein the plurality of baffles are evenly spaced apart about the at least one air line.

4. The partition assembly of claim 2, wherein the at least one air line includes at least one air valve.

5. The partition assembly of claim 1, wherein the base of each one of the plurality of baffles includes a pressure relief valve configured to allow air to flow therethrough to establish a uniform pressure across the plurality of segments of the tire cavity.

6. The partition assembly of claim 1, wherein:
the base of each one of the plurality of baffles defines an aperture in fluid communication with the at least one air line and in fluid communication with the air passageway of the base.

7. The partition assembly of claim 1, wherein the base includes acrylonitrile butadiene styrene (ABS) plastic and the expandable body includes butyl rubber.

8. The partition assembly of claim 1, wherein:
the seal is inflatable and is in fluid communication with the at least one air line by way of the base to receive air from the at least one air line; and
the seal is configured to contact the inner wall of the tire mounted to the wheel to form an air-tight seal with the tire and define the plurality of segments when the seal is inflated with air from the at least one air line.

9. The partition assembly of claim 1, wherein the seal is a nylon fabric reinforced polyurethane expandable seal.

10. The partition assembly of claim 1, wherein the expandable body defines a slot, and the seal is seated within the slot.

11. A partition assembly configured to be mounted in a tire cavity defined between a wheel and a tire to divide the tire cavity into a plurality of segments, the partition assembly comprising:
at least one air line;
a plurality of baffles, each one of the plurality of baffles including:
a base configured to be mounted to the wheel, the base defining an air passageway in fluid communication with the at least one air line;
a body connected to the base, the body is an expandable body in fluid communication with the at least one air line by way of the base; and
a seal extending about an outer perimeter of the body and in fluid communication with the air passageway of the base, the seal is expandable and configured to be filled with air from the at least one air line to expand the seal from a deflated configuration to an inflated configuration in which the seal is configured to contact an inner wall of the tire coupled to the wheel to divide the tire cavity into the plurality of segments.

12. The partition assembly of claim 11, wherein the at least one air line is a single air line extending around the wheel and is in fluid communication with each one of the plurality of baffles.

13. The partition assembly of claim 11, wherein the plurality of baffles are evenly spaced apart about the at least one air line, and the plurality of segments of the tire cavity are air-tight segments when the seal is in contact with the inner wall of the tire.

14. The partition assembly of claim 11, wherein the partition assembly divides the tire cavity into at least four of the plurality of segments.

15. The partition assembly of claim 11, wherein the seal includes a pair of inflatable lips secured to the outer perimeter of the body with a mechanical interlock.

16. A wheel assembly comprising:
a wheel including a rim;
a tire mounted to the wheel to define a tire cavity between the wheel and the tire;
a partition assembly mounted to the wheel in the tire cavity, the partition assembly including:
an air line extending around the wheel, the air line in cooperation with a valve configured to couple with an air source for introducing air from the air source into the air line; and
a plurality of baffles mounted to the wheel and connected to the air line to receive air from the air line, each one of the plurality of baffles is expandable from a deflated configuration to an inflated configuration in response to air from the air line flowing into the plurality of baffles, in the inflated configuration the plurality of baffles contact an inner wall of the tire to divide the tire cavity into a plurality of air-tight segments;
wherein each one of the plurality of baffles includes:
an expandable body in fluid communication with the air line to receive air from the air line for inflating the expandable body; and
a seal extending about an outer perimeter of the expandable body, the seal is in fluid communication with the air line to receive air from the air line for inflating the seal.

* * * * *